(12) United States Patent
Zeuner

(10) Patent No.: US 12,269,427 B2
(45) Date of Patent: Apr. 8, 2025

(54) SYSTEM FOR CARRYING, RECEIVING AND UNLOADING LOADS AND GOODS FOR ELECTRIC MOTOR VEHICLES AND HYBRID VEHICLES

(71) Applicant: Stefan Zeuner, Dresden (DE)

(72) Inventor: Stefan Zeuner, Dresden (DE)

( * ) Notice: Subject to any disclaimer, the term of this patent is extended or adjusted under 35 U.S.C. 154(b) by 1188 days.

(21) Appl. No.: 16/989,054

(22) Filed: Aug. 10, 2020

(65) Prior Publication Data
US 2020/0369212 A1    Nov. 26, 2020

Related U.S. Application Data

(63) Continuation of application No. PCT/DE2019/000032, filed on Feb. 9, 2019.

(30) Foreign Application Priority Data

Feb. 10, 2018  (DE) .......................... 202018000689.0

(51) Int. Cl.
*B60R 5/04*    (2006.01)
*B60P 1/42*    (2006.01)
(Continued)

(52) U.S. Cl.
CPC ............... *B60R 5/041* (2013.01); *B60P 1/42* (2013.01); *B60R 5/00* (2013.01); *B60R 5/042* (2013.01);
(Continued)

(58) Field of Classification Search
CPC .. B60R 5/00; B60R 5/006; B60R 5/04; B60R 5/041; B60R 5/042; B60R 9/00; B60R 5/045; B60R 5/047
See application file for complete search history.

(56) References Cited

U.S. PATENT DOCUMENTS

| | | | |
|---|---|---|---|
| 2003/0090120 A1* | 5/2003 | Barber | B60R 5/045 224/539 |
| 2014/0015238 A1* | 1/2014 | Juettner | B60K 15/067 180/68.5 |
| 2017/0297822 A1* | 10/2017 | Roldan Gonzalez | B65G 67/24 |

FOREIGN PATENT DOCUMENTS

| | | |
|---|---|---|
| DE | 202007014687 U1 | 2/2008 |
| DE | 102010056383 A1 | 6/2012 |

(Continued)

OTHER PUBLICATIONS

Degenstein et al., Rear-side transportation device for motor car, has loading and unloading containers movably mounted between transport position and rear-side of motor vehicle, Mar. 20, 2014, EPO, DE 10 2012 018 219 A1, Machine Translation of Description (Year: 2014).*

(Continued)

*Primary Examiner* — James A English
(74) *Attorney, Agent, or Firm* — Myers Wolin, LLC

(57) ABSTRACT

A system is provided for carrying, receiving and unloading loads and goods for motor vehicles and to a vehicle in which the system is installed. The system allows a maximally variable and simultaneously ideal cuboidal loading area by combining a foldable loading area on the lower face of the vehicle with a rail system, which is positioned on the vehicle lower base in order to receive a wide variety of transport goods and carrier systems and a level-regulating function. Thus, a reduction of the environmental impact of the motor vehicle equipped with the system according to the invention can be combined with a versatile use, whether as a car-sharing concept or private or logistical applications, and excellent loading ergonomics. Additionally, the rail system, the folding mechanism and the transported goods to be conveyed are weatherproofed.

19 Claims, 16 Drawing Sheets

(51) Int. Cl.
*B60R 5/00* (2006.01)
*B60R 9/00* (2006.01)
*B62D 33/02* (2006.01)
*G07C 9/00* (2020.01)

(52) U.S. Cl.
CPC ............ *B60R 9/00* (2013.01); *B62D 33/0207* (2013.01); *G07C 9/00896* (2013.01)

(56) References Cited

FOREIGN PATENT DOCUMENTS

| | | | |
|---|---|---|---|
| DE | 102012004821 A1 | 9/2013 | |
| DE | 202013007609 U1 | 1/2014 | |
| DE | 202013100573 U1 | 2/2014 | |
| DE | 102012018219 A1 | 3/2014 | |
| DE | 102015006597 A1 * | 12/2015 | ........... B60G 17/016 |
| KR | 100331088 B1 * | 11/2002 | |

OTHER PUBLICATIONS

Steller et al., Rear section for motor vehicle, has car body undercarriage and undercarriage cladding arranged within car body undercarriage, Jun. 28, 2012, EPO, DE 10 2010 045 383 A1, Machine Translation of Description (Year: 2012).*

Seung U Yoo, Apparatus for Automatically Adjusting Vehicle Height Upon Opening/Closure of Vehicle Trunk Door, Nov. 7, 2002, USPTO, KR 100331088 B1, Machine Translation of Description (Year: 2002).*

Johan Hesse, Level Adjustment In A Vehicle, Dec. 3, 2015, EPO, DE 10 2015 006 597 A1, Machine Translation of Description (Year: 2015).*

International Search Report issued by the International Searching Authority for corresponding International Patent Application No. PCT/DE2019/000032, mailed May 8, 2019.

* cited by examiner

SYSTEM FOR CARRYING, RECEIVING AND UNLOADING LOADS AND GOODS FOR ELECTRIC MOTOR VEHICLES AND HYBRID VEHICLES

CROSS REFERENCE TO RELATED APPLICATIONS

This application is a continuation under 35 U.S.C. § 120 of International application No. PCT/DE2019/000032, filed on Feb. 9, 2019, which claims priority to German patent application No. 202018000689.0, filed on Feb. 10, 2018, the contents of each of which are incorporated by reference herein.

TECHNICAL FIELD

The present invention relates to a system for carrying, receiving and unloading loads and goods for electrically operated motor vehicles and hybrid vehicles. Furthermore, the invention relates to a vehicle in which the system is installed.

BACKGROUND OF THE INVENTION

For the transport and reception of goods in and on motor vehicles there are a variety of different solutions, which are often optimized for a specific transport good, are typically distinguished by the location of the accommodation and have been developed for motor vehicles with an internal combustion engine drive. In addition, the majority of the solutions have been adapted to the finished vehicle, so constructive compromises have to be made.

A variety of carrier systems are known, which are attached to the outside of the vehicle, primarily on the roof or at the rear, for example for bicycles (DE 202016104011 U1) or roof boxes, these have also been increasingly partially optimized in recent years, such as by means of a foldable, optimally integrated roof rack (DE102017201527A1).

Carrier systems for bicycles for the interior are also known (DE 102013212669A1, DE202016006976U1).

In addition to the mentioned, solutions for the transport of goods on the lower face of the vehicle are known, these are more for the camping field (DE202013100573U1, AU2012227161B2) or partially integrated solutions for the rear area of motor vehicles such as drawers (DE102012004821A1, DE102013012126A1).

Rail systems are known for a large number of applications for motor vehicles, but primarily for the interior and here for fastening 'furniture' (DE102015224098A1).

Foldable containers are known in the field of transportation of goods as a folding box for attachment in or on a motor vehicle (DE102005049340A1) and as a vertically foldable truck trailer (WO2016/048472), the latter are realized by means of a claw-grid construction.

Solutions are known for the transport of temperature-sensitive goods that enable temperature control or include a power connection (DE102009012404A1).

The solutions for the exterior are characterized by disadvantages such as poor ergonomics, poor aerodynamics, tendency to pollution and ineffective theft protection, even if improvements are achieved by partial optimization. Against the background of demographic changes, the first point in particular is gaining in importance. Furthermore, despite the existing habitation effect, there is no aesthetic gain.

Carrier systems for the interior are often complex to assemble and, for example, usually require partial disassembly in the case of bicycles. In addition, the vehicle interior can be affected by dirt and unpleasant smells.

The carrier systems are usually not foldable or collapsible after use, so that storage space must be kept available when not in use.

Applications for city logistics often have structural disadvantages, such as a drop-off application for the trunk, which makes access to the private area of the vehicle inevitable, even if only once, the use-case-specific conversion of the vehicle or the lack of automation for loading and unloading.

Transport solutions for the lower base of the vehicle have so far been limited to smaller boxes, since the exhaust system does not allow larger solutions when using internal combustion engines. This limitation is no longer justified with the design of vehicles for electric drives.

Almost all known solutions also have in common the fact that by installing or assembling such systems, a 'sharing' of the vehicle is made significantly more difficult in practice or the application-dependent solutions would have to be provided and installed separately for each individual use case.

The systems according to the prior art described at the beginning generally have in common that they each work to optimize the solution of a specific transport problem in the given context—i.e. a known arrangement configuration of a motor vehicle driven by an internal combustion engine—and thus often a conflict of important target values arises.

OBJECT OF THE INVENTION

The object of the invention is to provide a transport system for a motor vehicle that pairs maximum versatility of usability and rapid adaptation to different applications with excellent ergonomics of loading and unloading by specific selection and design of the sub-components and their specific, close interaction while avoiding disadvantages of existing solutions, such as pollution, lack of theft protection, poor aerodynamics, bulkiness when not in use.

The object is achieved by the device according to the invention in that the selected technical subsystems 'foldable loading area' on the lower base, 'level regulating system' and 'rail system' to receive the (heavy) loads to be transported in conjunction with a specially shaped rear axle construction by means of their coordinated and freely programmable control via the bus system of the vehicle, which organically fit together that a simple and intuitive overall system is created.

SUMMARY OF THE INVENTION

Embodiments of the present invention aim to provide a Device for carrying, receiving and unloading loads and goods below the passenger compartment for electrically operated motor vehicles and hybrid vehicles, characterized in that the device comprises a load-bearing rail system that is integrated in the vehicle lower base (7), a level regulating system which moves the vehicle body to a height defined by the system relative to the road surface, a foldable loading area (5) for carrying, receiving and unloading loads and goods, which is fixed to the vehicle lower base (7) and a rear axle of the type longitudinal arm axle or composite arm axle, the stopping point of which is located on the side of the vehicle lower base (7) or on the side edge of the vehicle lower base (7).

BRIEF DESCRIPTION OF DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

From this illustration, the arrangement of the profile rails (9) with servomotor eccentric shaft (15) for locking and unlocking can be seen as well as the claw grid (6) and its servomotors (8), which are responsible for the unfolding and folding of the loading area.

Figure 7:
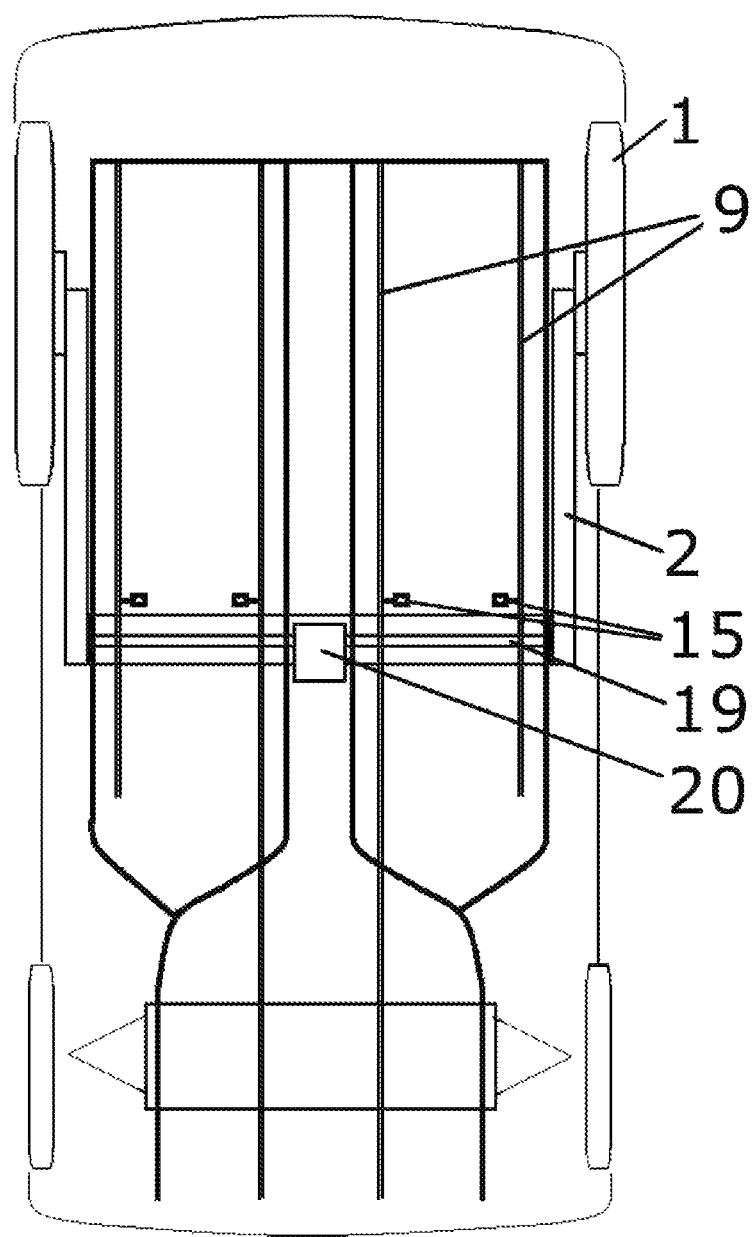

FIG. 7 shows the schematic structure of the vehicle from below, in addition to the course of the rails at maximum length, the arrangement of the vehicle driving electric motor (16) and the drive shafts (15) can be seen.

Figure 8:
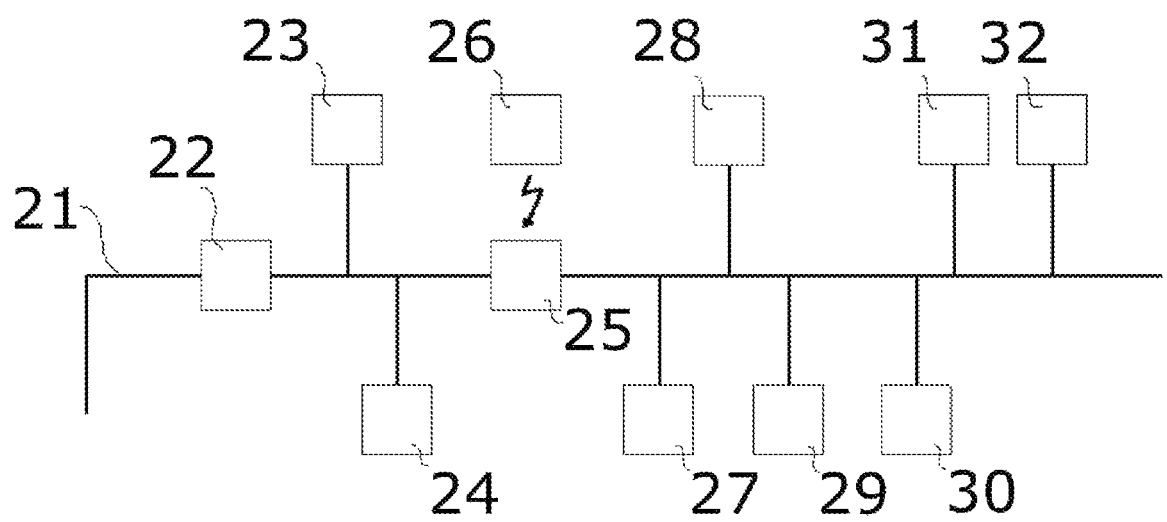

FIG. 8 shows the schematic overview of the integrated electronic components on the vehicle's own bus system (21).

Figure 9:
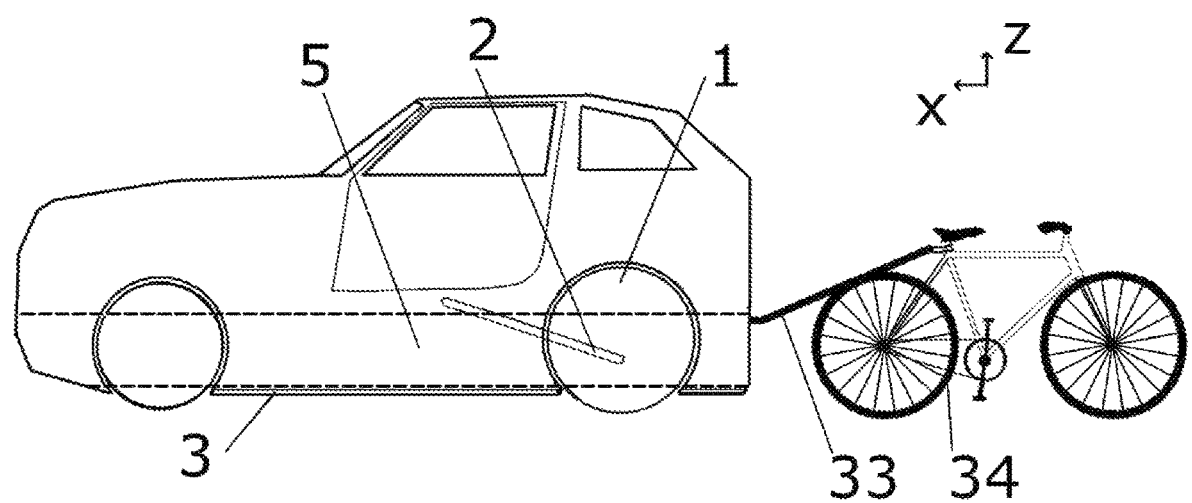
Figure 10:
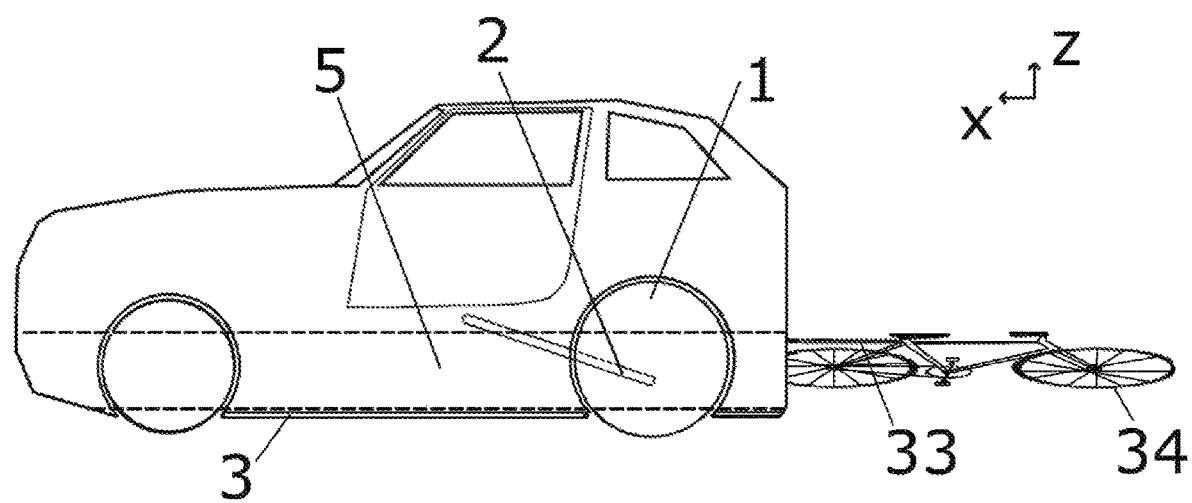

FIG. 9 and FIG. 10 show schematically the case of loading with a bicycle (34).

Figure 11:
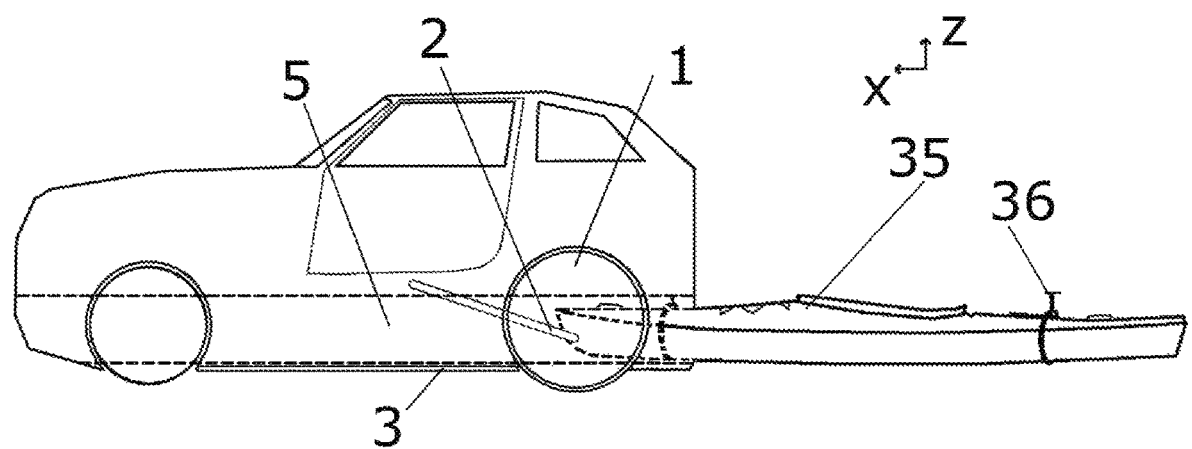

FIG. 11 shows schematically the case of loading with a kayak (35).

Figure 12:
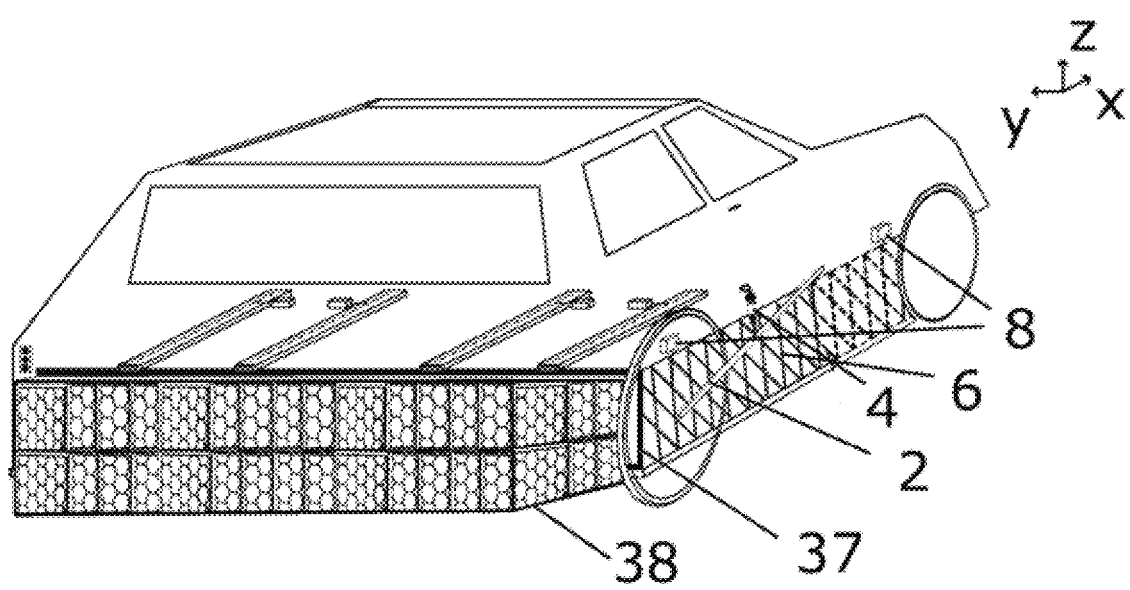

FIG. 12 schematically shows the case of loading with a package of several standard containers (38) put together by means of physical internet boxes.

Figure 13:
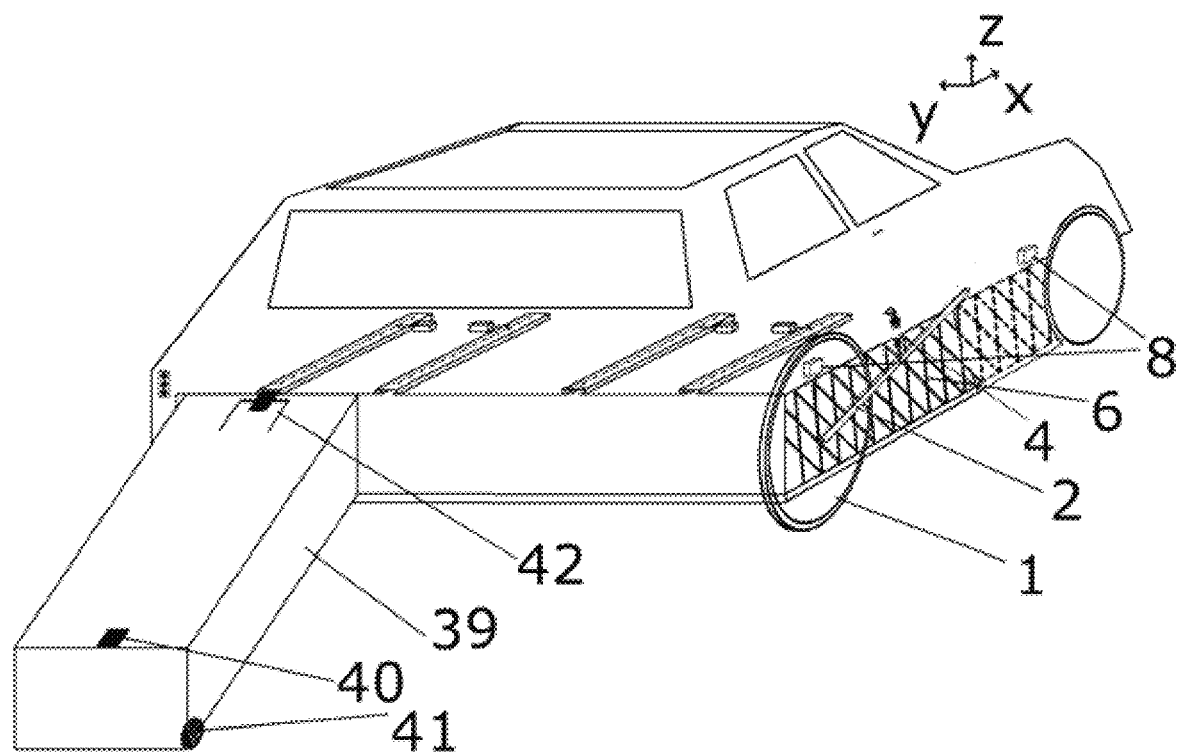

FIG. 13 schematically shows the case of loading with a trolley type container (39) to be used as a shopping trolley.

Figure 14:
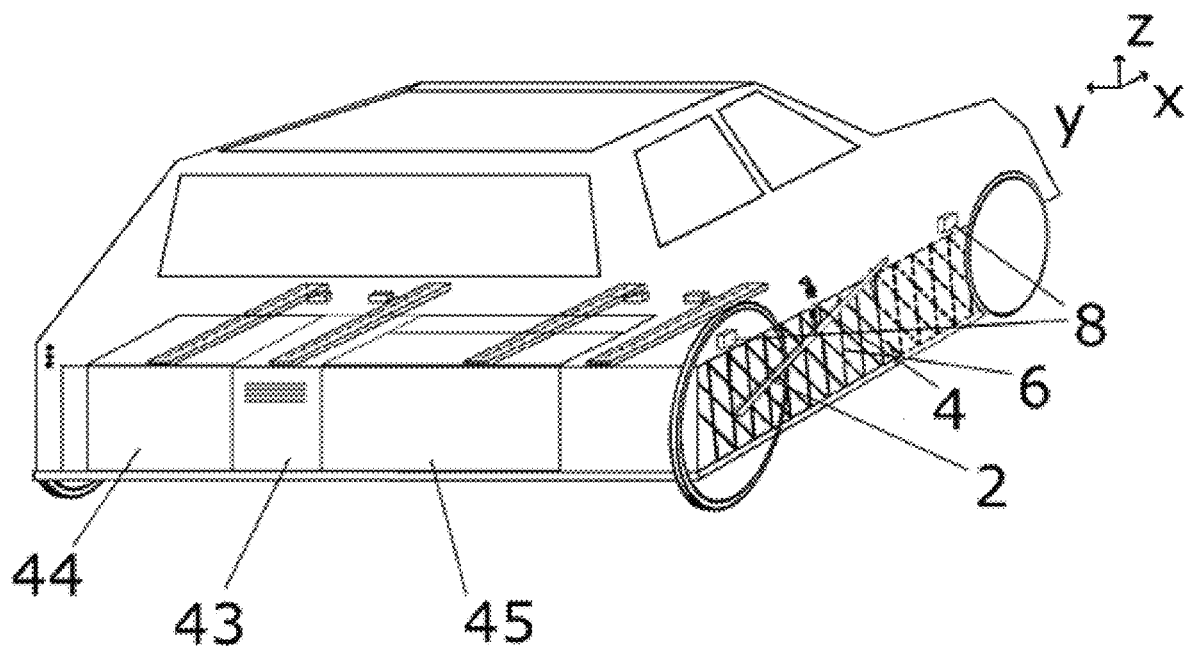

FIG. 14 shows schematically the case of separate containers for heating (44) and cooling (45) inside the loading area (5).

Figure 15:
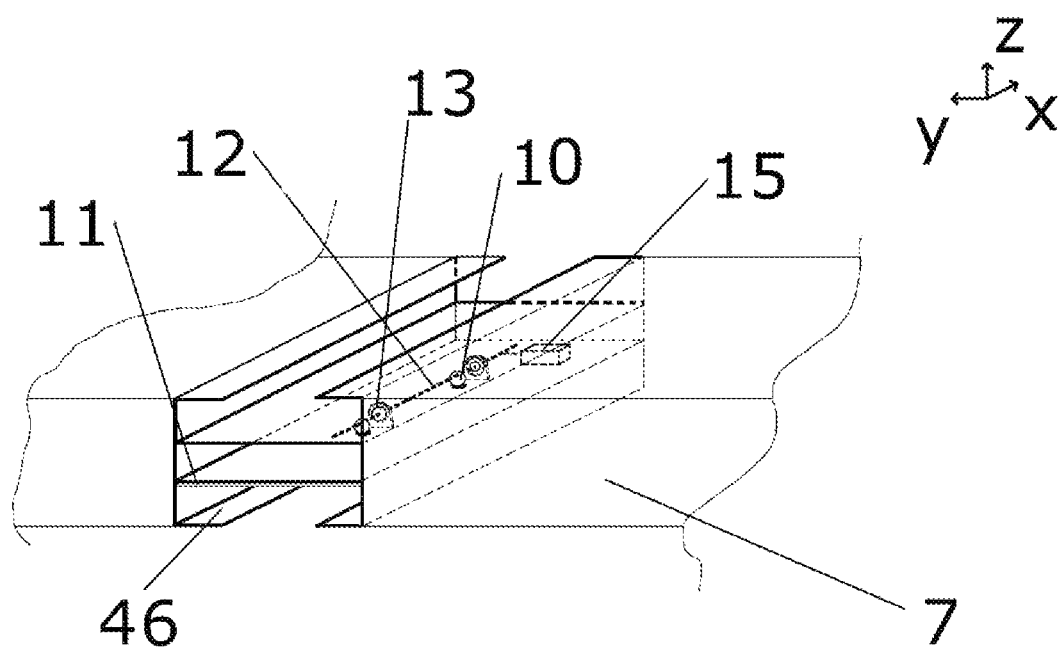

FIG. 15 schematically shows a constructive variant with an additional profile for fastening 'furniture' in the vehicle interior as a double profile rail (46).

Figure 16:
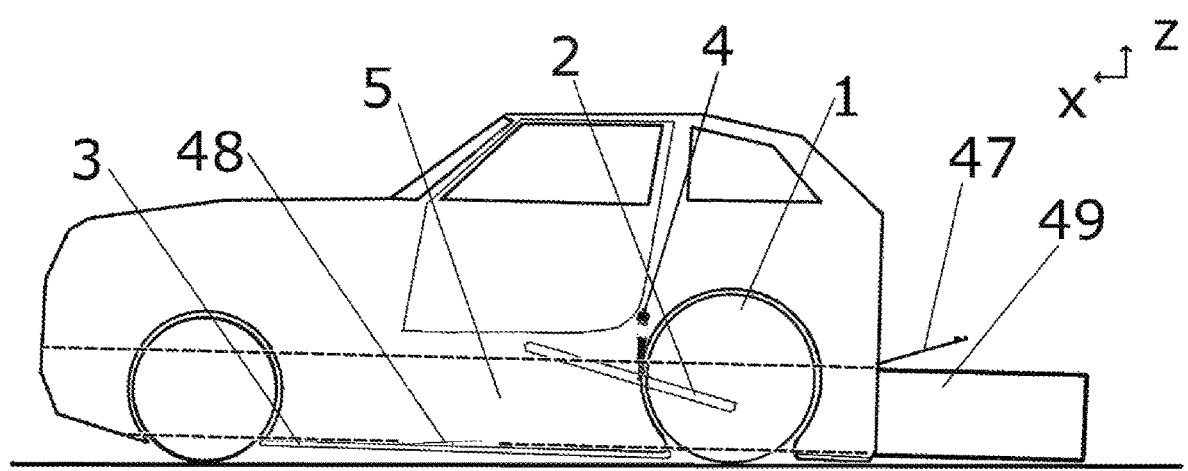

FIG. 16 schematically shows the case of automatic unloading of a container (49).

DETAILED DESCRIPTION OF EMBODIMENTS

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

The specific rear axle construction is to be seen as a constructive requirement through which the large foldable loading area between the two longitudinal arms can be 'spanned' at all.

The connection of the technical subsystems mentioned to the vehicle's own bus system ensures that their control and function can be both seamlessly integrated and coordinated. For example, the function and control speed of the servo motor for the claw-grid is directly coordinated with the actual height of the vehicle provided by the ECU of the level regulating system and unlocking of the rail system for loading is only authorized when both the level regulating system and the servomotor signal completion of the regulatory unfolding of the loading area. Analogously, it is ensured that the loading area can only be folded in when the rail system is not occupied, and the vehicle is lowered in parallel only at the maximum control speed of the servomotor of the folding mechanism.

The advantages of the system according to the invention are, in addition to the maximum ergonomic positioning of the loading area and the safe and pollution-protected storage of the cargo, above all the use-dependent adaptability of the system in terms of operation-different maximum lifting heights, freely definable 'lifting grids' and control speeds- and goods to be transported and the intuitive, playful ease of use. Due to the design-related maximum openness, the system can serve a variety of different usage scenarios by means of application-specific subsystems to be used in the rail system, and this in the shortest possible conversion time. A loading area with such a wide range of uses, which is always available at the push of a button but is virtually 'invisible' when not in use, is not yet known. In addition, the system has the great advantage that it offers a number of 'use cases' in the built-in vehicles, both for purely private, purely commercial and mixed use without conversion measures, commercial re-use of a private vehicle is just as conceivable as a highly efficient use as car sharing vehicle with changing task profiles.

After all, this integrated solution is excellent in terms of both optical and aerodynamic optimization, in both aspects, both when unfolded and when closed.

Figure 1:
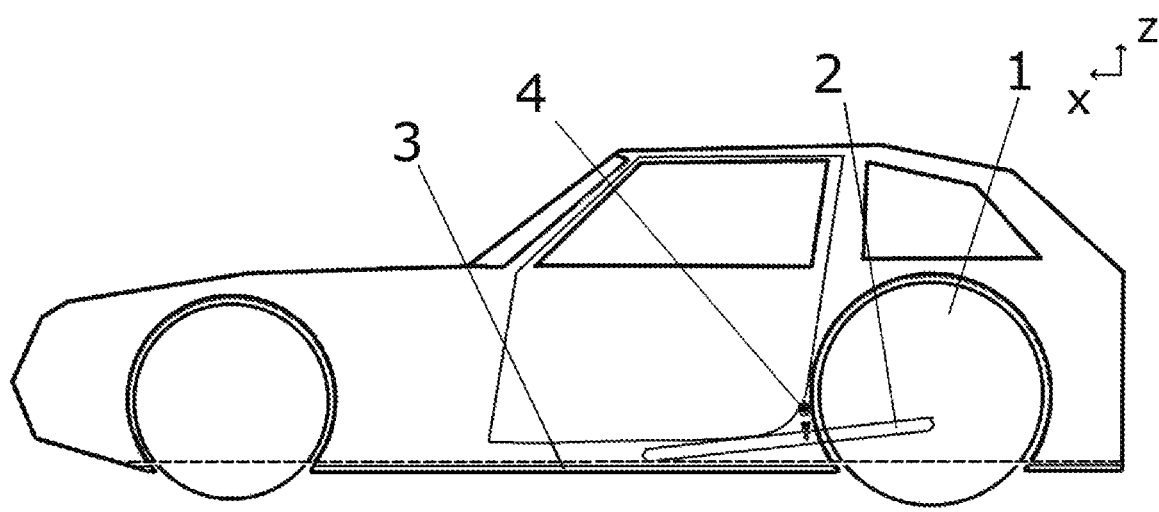
FIG. 1 shows the car with the luggage compartment folded, the longitudinal arms of the rear axle (2) are in a position that holds the body of the vehicle at a level near the ground, the lower shell (3) bears against the vehicle lower base.
Figure 2:
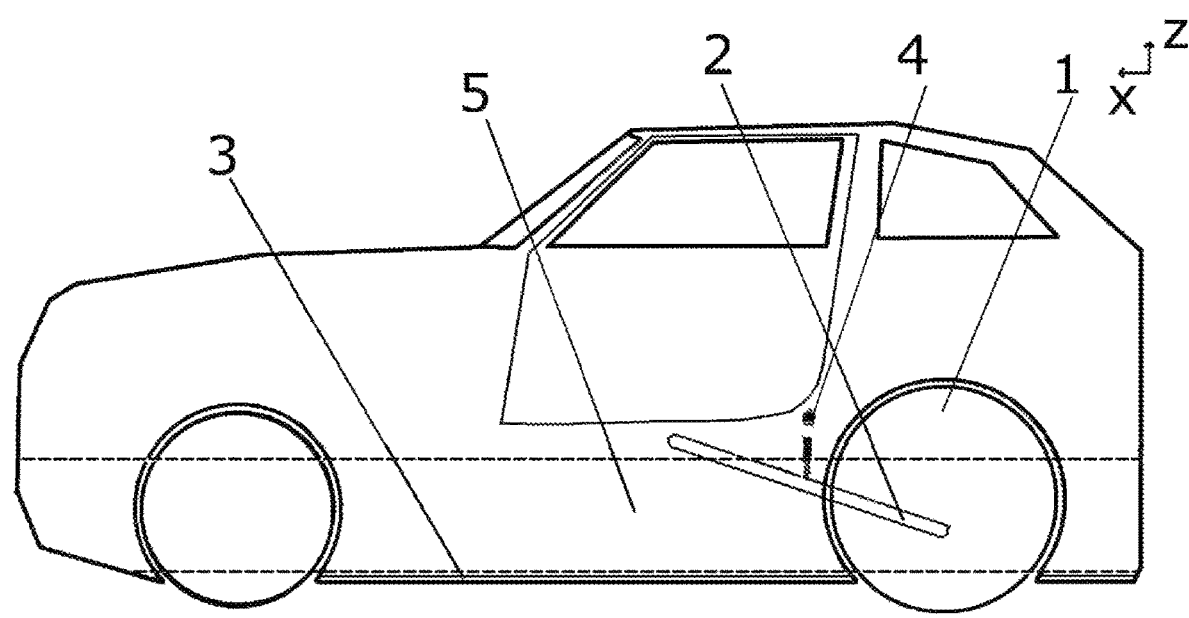
In FIG. 2, the motor vehicle is brought to a maximum height position by means of the ECU of the level regulating system (27) and the spring-damper unit (4) has been brought into a maximum height position, the trailing arm (2) has accordingly changed its inclination. The loading area (5) has been unfolded and takes up the space between the two dashed lines.

In FIG. 1 and FIG. 2, the lateral external view of a vehicle equipped with the device according to the invention is shown schematically, wherein the area of the unfolded loading area (5), the positioning of the spring-damper unit (4), the rough position of the longitudinal arm of the rear axle (2) with the rear wheel (1) and the lower shell (3) that closes the loading area downwards are recognizable.

In a preferred embodiment of the device according to the invention, on the one hand, the potential installation space between the rear wheels (1) of the respective vehicle is provided by a corresponding longitudinal arm construction of the rear axle. In comparison to known designs, this is equipped with longer longitudinal arms (2) in order to achieve a sufficient lifting height. Due to the particularly heavy loads, the longitudinal arm (2) will either be made of high-strength steel, a carbon fiber-reinforced plastic or a multi-material combination.

Furthermore, the foldable loading area (5) in the space between the longitudinal arms (2) is realized in such a way that a claw grid lifting system is used.

Figure 3:
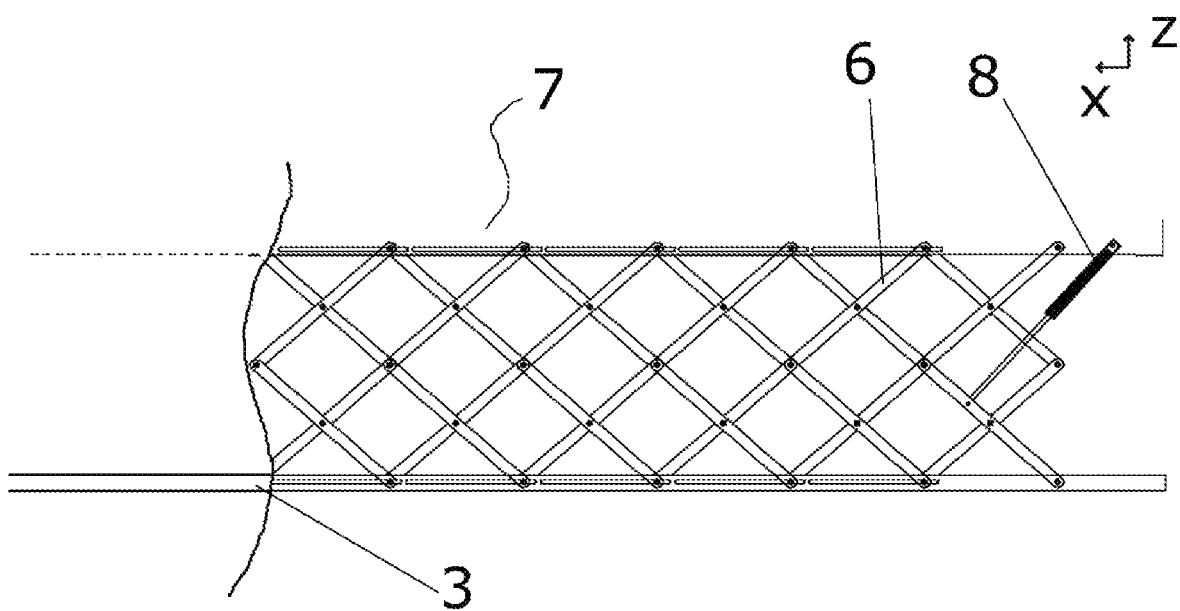
FIG. 3 shows the claw grid system with the loading area (5) unfolded with the components claw grid (6) and servomotor claw grid (8), its attachment to the vehicle lower base (7) and the ending of the loading area downwards by means of the lower shell (3).

The claw grid lifting system comprises, as can be seen in FIG. 3, the claw grid (6), which is firmly attached laterally to the vehicle lower base (7), the servomotor (8) for the claw grid lifting system and as the lower end of the lower shell (3). By actuating the servomotor (8) connected to the vehicle's own bus system (21), the claw grid (6) is opened and closed.

Both the claw grid (6) and the lower shell (3) are preferably realized with composite materials such as fiber-reinforced plastics in order to construct easily and space-saving. This 'reconstruction' forming the loading area (5) can be constructed particularly easily, since the heavy loads to be carried are carried by the rail system.

Figure 4:
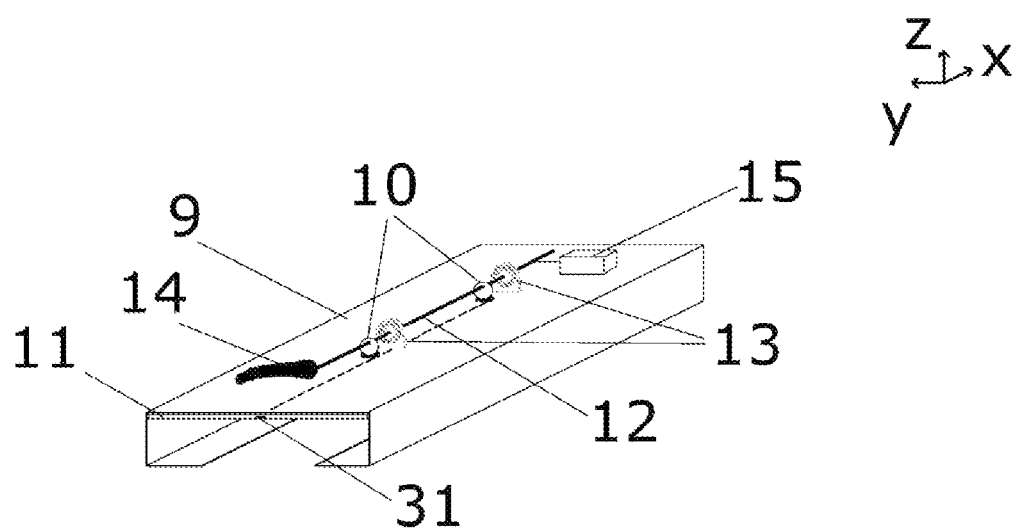
FIG. 4 shows the schematic structure of the locking and unlocking mechanism of the rails. The basic technical design of a rail system is known, the technical design is modified in that the loads are attached in a hanging manner. Furthermore, the locking and unlocking mechanism is adapted so that both manual and electromechanical locking and unlocking are possible.

The rail system is formed by at least one variant shown in FIG. 4 and the following as preferred embodiment, by four profile rails (9) which are structurally embedded in the vehicle lower base (7) and a locking mechanism that can be operated both electromechanically and manually and is connected to the vehicle's own bus system (21).

By integrating the rail system into the stable floor construction of the passenger compartment, there is a large potential payload for transportation without resulting in additional weight.

The locking of the rail system is preferably designed so that each profile rail (9) can be locked and unlocked individually, a version of a continuous profile rail with several locking segments is also conceivable, so that even loaded individual goods can be unloaded individually (automatically).

In FIG. 4 the basic functioning of the locking of the rail system is shown. Here, by rotating the eccentric (10), the flat material (11) fitted into the profile rail (9) is pushed down, as a result of which a clamping connection with the inserted sliding blocks, the roller- or ball-bearing suspension systems or, as in the case of the preferred variant shown in FIG. 5, with the rollers (16) fixedly mounted on the profile rail (9) and the carrier profile (17) inserted between the flat material (11) and rollers (16) are produced. The rotational movement is induced—mediated by a torsionally rigid eccentric shaft (12) which is guided through adequately positioned bearings (13)—manually by means of a lever (14) or electrically by means of a servomotor (15) coupled to the vehicle's bus system (21).

Alternatively, the clamping connection can also be produced directly by servomotors working in the z direction, which, mounted above the profile rail (9), act on the flat material (11).

Figure 5:
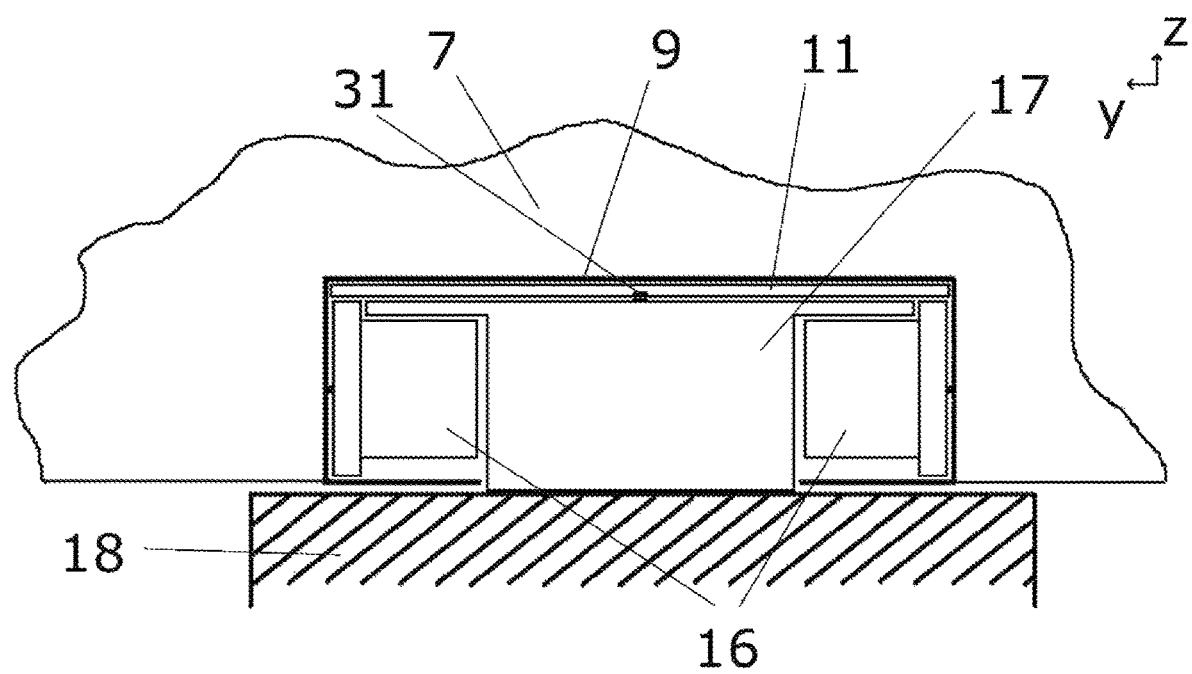
FIG. 5 shows the front view of a profile rail (6) with permanently installed rollers (16) and insertable carrier profile (17) bearing the loads.
Figure 6:
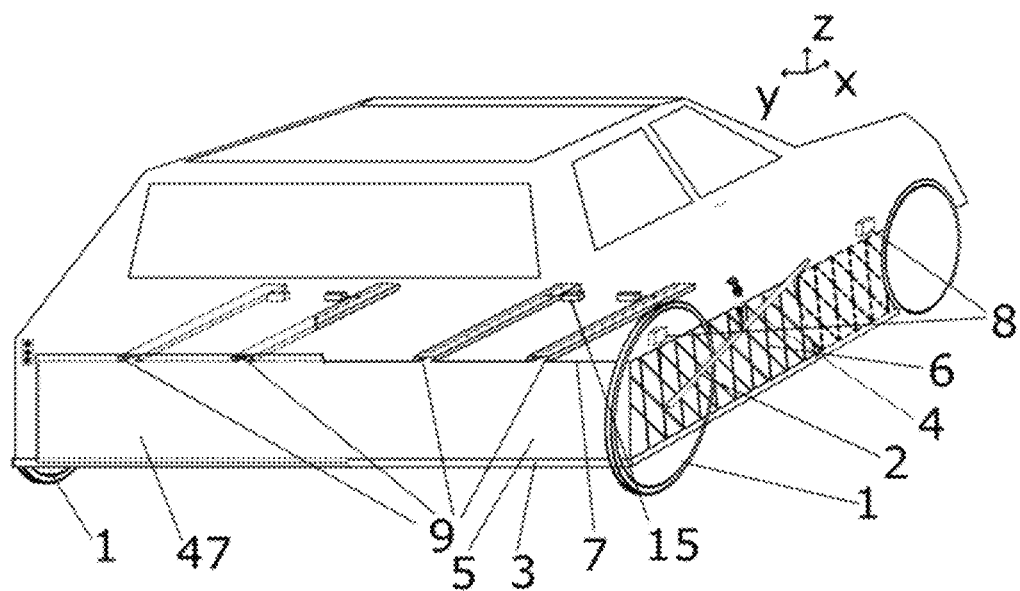
FIG. 6 shows the motor vehicle obliquely from behind with the subsystems involved in with the loading area (5) unfolded.

In FIG. 4 and FIG. 5, the electrical connection is also indicated by an interface (31) incorporated into the flat material (11), which can also provide both sensor information and power supply in segments.

The level regulating system consists in the preferred embodiment, among others, of spring-damper units (4) which are similar to side-by-side buggies attached to the longitudinal arm of the rear axle (2). The large length of the longitudinal arms (2) and the stroke of these spring-damper units (4) result in the particularly large overall stroke for the system according to the invention. The level regulating system is also coupled to the vehicle's own bus system (21).

The specific interaction of the individual components or subsystems of the system according to the invention is to be illustrated using the most basic 'basic case', in which the vehicle is at a height below Hmax and the loading area (5) is in the folded state (FIG. 1) is located and a loading of the vehicle is to be made possible.

After entering the command 'establish state of charge'—this can optionally be done via a control element (24) on the dashboard or via a communication interface (25) via smartphone or tablet (26)—the vehicle's internal check is first carried out to determine whether the vehicle is stationary. This is done by querying the vehicle speed sensor information (29). If this is the case, it is brought to the maximum height by means of the control unit or ECU of the level regulating system (27) and the spring-damper unit (4).

In parallel, the loading area (5) is unfolded at a speed which corresponds at most to the real vertical lifting speed of the level regulating system, that is to say the control speed of the system.

This is done by extending a piston on the servomotor (8) of the claw grid, which acts in a manner shown in FIG. 3 on one leg of the claw grid (6), so that this unfolds.

Then the clamping device of the complete rail system is set to 'unlocked' by means of the servomotors of the eccentric shaft (15), so that subsystems of any kind can be introduced.

After insertion of the goods to be transported or the subsystem, which is intended to enable secure fastening of a special good to be transported, the rail system is locked again.

When rotating the eccentric shaft (12) and thus the eccentric (10), the clamping flat material (11) is pressed down during the locking, in order to be connected to the sliding block or the balls or the rollers (16) together with the carrier profile (17) to establish a strong clamping connection with the flat material (11).

By coupling the subsystems to the vehicle's internal bus system (21), the loading situation of the vehicle is known and can be used to control the level control system while driving, the safe locking of the rail system is monitored by an appropriate sensor status locking rail (28). It is also possible to set up and activate interfaces to the boxes (31) to be loaded, via which temperature data, for example in the case of temperature-controlled boxes, are sent to a display device in the vehicle interior (23).

User Scenarios:

After the loading condition has been established and a bicycle holder (33) is attached, which is fastened on the rail side by means of a slide-guided receptacle or, in the case of fixedly mounted rollers, by means of a carrier profile (17) and which, in addition to a swivel arm, also contains a swivel joint constructively, the bicycle (34) is placed behind the vehicle in the manner shown in FIG. 9. After clamping the swivel arm of the bicycle holder (33) to, for example, the seat post, the bicycle (34) can be conveniently lifted and rotated until, as shown in FIG. 10, it can be pushed into the unfolded loading area (5).

After the loading state has been established, the vehicle is equipped with the front kayak holder and the kayak (35), as outlined in FIG. 11, with an attached rear kayak holder (36) is inserted with sliding blocks or carrier profile (17).

Analogous to the above applications, corresponding cases of this type are conceivable with bulky individual goods such as surf or kite equipment, musical instruments, architectural models, ladders etc.

In a 'drop-box' application, after locating the vehicle by means of the GPS location enabled for the CEP service provider, which is carried out via the central control unit (22) of the vehicle, this can receive by means of its courier terminals/tablets (26) authorization via the communication interface of the vehicle (25), for example to place a package in the loading area (5). After authorization, the vehicle automatically brings itself into the ready-to-load state with the loading area (5) unfolded by means of a programmed routine and controls the locking of the tailgate lock (30).

After opening the tailgate (47), inserting the package and closing the tailgate (47), the vehicle remains in a raised position and can inform the receiver of the package (which can also be the holder of the vehicle) via its communication interface (25) in respect to acceptance of the package. If in a case of use to be defined as a short-term parcel depot, parcel acceptance is also made possible for non-drivers of the vehicle, the parcel recipient can also be granted access to the loading area via the same process as the CEP service provider in order to remove the parcel that was delivered.

To use the device according to the invention as a practical building block for city logistic applications, a subframe (37) can be introduced into the rail system after the readiness for loading has been established, which can accommodate larger, aggregated city logistic units, which are fixed to each other—also a package of several standard containers (38)—, for example, the type of container of the Modulushca project developed for a physical internet to be realized. FIG. 12 illustrates such a loading case. In this way, a very quick and uncomplicated 'taking along' of container packages can be easily realized.

An application scenario is outlined in FIG. 13, which represents the use of the device according to the invention for transporting a 'trolley-type container' (39) which, in addition to the trolley holder (40) matching the rail system, also has wheels (41). and has a pull-out bracket (42). With this, on the one hand, a safe transport of, for example, shopping goods in the vehicle, and also an ergonomically usable trolley for the transport of goods outside the vehicle is ensured. Furthermore, an application is conceivable in which the heavier, unwieldy part of a purchase for the customer is conveniently delivered to the car—with the above advantages of the system in terms of privacy—and this can also be conveniently discharged.

FIG. 14 shows a scenario which, for example, offers advantages when used by delivery services that transport goods to be tempered. By inserting a cooling unit (43), which also includes heating functions, the loading area can be equipped with both heatable containers (44) and coolable containers (45). In addition to the added value in terms of usage scenarios, there are also potentials for energy savings.

In FIG. 15 an extended to the vehicle interior, a double profile rail (46) is shown, provided with an additional receptacle, which in addition to the functionality of the rail system according to the invention comprises a downward rail and locking functionality by means of flat material (11), eccentric (10), eccentric shaft (12) including the bearing (13) and servomotor (15) for this also has a rail mount for 'furniture' to be fastened in the vehicle interior. By means of such a double profile rail (46), both the use of materials and the design effort for the vehicle can be minimized, and it is also obvious to include constructive tasks with regard to the stability of the vehicle cell.

Container elements that are equipped with special sliding blocks with low coefficient of friction or better are equipped with ball or roller bearing suspension systems can also be automatically unloaded with the aid of the system according to the invention.

This is accomplished by opening the locking of the tailgate lock (30), only lowering the rear axle by means of the ECU of the level regulating system (27) until the vehicle reaches an inclined angle α and opening the rail locking system. Due to the inclination of the vehicle body, the container (49) can now slide or roll outward by gravity, the tailgate (47) is pushed open by the container (49).

Further, the word "module," as used herein in the specification, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

It should be noted that where the terms "server", "secure server" or similar terms are used herein, a communication device is described that may be used in a communication system, unless the context otherwise requires, and should not be construed to limit the present disclosure to any particular communication device type. Thus, a communication device may include, without limitation, a bridge, router, bridge-router (router), switch, node, or other communication device, which may or may not be secure.

Further, the operations need not be performed in the disclosed order, although in some examples, an order may be preferred. Also, not all functions need to be performed to achieve the desired advantages of the disclosed system and method, and therefore not all functions are required.

The terms and descriptions used herein are set forth by way of illustration only and are not meant as limitations. Examples and limitations disclosed herein are intended to be not limiting in any manner, and modifications may be made without departing from the spirit of the present disclosure. Those skilled in the art will recognize that many variations are possible within the spirit and scope of the disclosure, and their equivalents, in which all terms are to be understood in their broadest possible sense unless otherwise indicated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

REFERENCE SIGN LIST

1—rear wheel
2—longitudinal arm of the rear axle
3—lower shell
4—spring damper unit
5—(foldable) loading area
6—claw grid
7—vehicle lower base
8—claw grid servomotor
9—profile rail
10—eccentric
11—flat material
12—Eccentric shaft torsionally rigid
13—Eccentric shaft bearing
14—Lever for manual operation
15—Eccentric shaft servomotor
16—roller
17—support profile
18—transported goods
19—drive shaft
20—electric motor
21—bus system
22—ECU—central control unit
23—vehicle interior display device
24—vehicle interior control element
25—communication interface
26—smartphone/tablet/CEP terminal
27—ECU level control system
28—status locking rail
29—vehicle speed sensor information
30—tailgate lock
31—Box 1 interface
32—Box 2 interface
33—swiveling and extending bicycle holding unit
34—bike
35—kayak
36—kayak mount with sliding blocks
37—subframe
38—package of several standard containers
39—trolley type container
40—trolley holder
41—wheel for trolley type containers
42—pull-out bracket
43—cooling unit
44—heatable containers
45—coolable containers
46—double profile rail
47—tailgate
48—angle α
49—container

The invention claimed is:

1. A device positioned under a passenger compartment of an electric vehicle or a hybrid vehicle for loading, receiving and unloading goods, wherein the device comprises:
a load-bearing rail system, integrated in a vehicle lower base (7);
a level regulating system for adjusting a body of the vehicle to a defined height relative to a road surface;
a collapsible loading area (5) secured to said vehicle lower base (7) and used for loading, receiving and unloading loads and goods; and
a rear axle selected from a longitudinal axle or composite arm axle, wherein the rear axle is arranged relative to the vehicle lower base (7) such that movement of the rear axle is constrained along a side or side edge of the vehicle lower base (7), wherein the rear axle (2) together with the level regulating system is adapted to achieve a sufficient lifting height.

2. The device of claim 1, wherein the rail system is aligned with a longitudinal axis of the vehicle.

3. The device according to claim 1, wherein the rail system comprises at least one profile rail (9) for slidably loading, storing and unloading slides, rollers or ball bearing suspension systems, wherein said slider, roller or ball bearing suspension system is connected or connectable to at least one separate item or at least one subsystem.

4. The device of claim 1, wherein the rail system has a variable length.

5. The device of claim 3, wherein the at least one profile rail comprises a plurality of profile rails, and the plurality of profile rails are arranged axially parallel.

6. The device of claim 5, wherein the rail system has an integrated locking or clamping function, wherein:
the locking or clamping function is locked and unlocked mechanically and electromechanically;
said locking or clamping function structurally divides each of said profile rails into at least one subsection, so that each subsection is locked and unlocked separately;
the locking or clamping function is provided in sections by sensors and actuators connected to the vehicle's own bus system (21); and
the locking or clamping function is operated from inside a vehicle via a corresponding control element (24) and from outside the vehicle via a communication interface (25).

7. The device of claim 1, wherein the rail system is adapted to accommodate a plurality of individual loads, each load having its own slider, roller, or ball bearing suspension system.

8. The device of claim 1, wherein said rail system is adapted to accommodate different subsystems, each of said subsystems providing a specific transport function for one or more large individual loads without suspension system.

9. The device of claim 1, wherein the rail system is adapted to accommodate various subsystems that quickly receives and unloads boxes, packages, or standard containers.

10. The device according to claim 1, wherein a conveyor for loading is integrated into the rail system.

11. The device according to claim 1, wherein said rail system comprises a double profile guide rail (46) arranged on said vehicle lower base (7) as well as comprising rail brackets for mounting known equipment inside the vehicle.

12. The device according to claim 1, wherein the level regulating system is capable of maintaining the body of the vehicle at a prescribed height relative to the road surface in an independently adjustable manner.

13. The device according to claim 1, wherein the level regulating system is connected to a bus system (21) of the vehicle such that the level regulating system is controlled via a control element (24) in an interior of the vehicle or via a communication interface (25) outside the vehicle is used to adjust the height of the vehicle.

14. The device according to claim 1, wherein the level regulating system is connected to a bus system (21) of the vehicle in such a way that a change in an angle $\alpha$ (48) with respect to a longitudinal axis of the vehicle is made possible by a lowering of the rear axle of the vehicle, wherein the rear axle of the vehicle is lowered within a specified area, whether the vehicle is stationary or at speeds up to 5 mph.

15. The device according to claim 1, wherein the collapsible loading area (5) is deployed by means of a claw grid lifting system.

16. The device according to claim 15, wherein a means for controlling the claw grid lifting system is connected to a bus system (21) of the vehicle.

17. The device according to claim 1, wherein the collapsible loading area (5) is enclosed by a lower shell (3) at a bottom of the vehicle, wherein:
   the lower shell (3) is made of composite materials and is only used for direct loading of light cargo, with a total weight of not more than 50 kg; and
   the lower shell (3) only moves in a vertical direction (z direction) through the folding mechanism.

18. The device according to claim 1, wherein a foldable loading area (5) is surrounded by a rollable or foldable opaque material outside a claw grid (6).

19. A vehicle being a motor vehicle with an electric or hybrid-electric drive, comprising a device according to claim 1.

* * * * *